US007276715B2

(12) United States Patent
Climent et al.

(10) Patent No.: US 7,276,715 B2
(45) Date of Patent: Oct. 2, 2007

(54) METHOD AND APPARATUS FOR SAFELY HANDLING RADIOACTIVE SOURCES

(75) Inventors: Helene C. Climent, Sugar Land, TX (US); Ronald M. Milkovisch, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 422 days.

(21) Appl. No.: 10/906,715

(22) Filed: Mar. 3, 2005

(65) Prior Publication Data

US 2005/0230646 A1 Oct. 20, 2005

Related U.S. Application Data

(60) Provisional application No. 60/559,562, filed on Apr. 5, 2004.

(51) Int. Cl.
*G01V 5/10* (2006.01)

(52) U.S. Cl. .................. 250/506.1; 250/254; 250/256; 250/257; 250/268; 250/506.1; 220/212.5; 220/752; 220/768; 220/770

(58) Field of Classification Search .............. 250/506.1
See application file for complete search history.

(56) References Cited

U.S. PATENT DOCUMENTS

| | | | | |
|---|---|---|---|---|
| 3,710,121 | A * | 1/1973 | Bedrosian | 250/506.1 |
| 4,845,359 | A | 7/1989 | Wraight | |
| 4,883,637 | A * | 11/1989 | McDaniels, Jr. | 376/272 |
| 5,126,564 | A | 6/1992 | Perry et al. | |

* cited by examiner

*Primary Examiner*—Robert Kim
*Assistant Examiner*—James J Leybourne
(74) *Attorney, Agent, or Firm*—Kevin P. McEnaney; Jaime Castaño

(57) ABSTRACT

A system for handling a radioactive source includes a container containing a radioactive source and a cap mounted on the container to retain the radioactive source inside the container. The cap has a first locking structure and a second locking structure. The system further includes a handling tool having a support shaft, a first locking tip adapted to form a first lock with the first locking structure, and a second locking tip adapted to form a second lock with the second locking structure. The first and second locking tips are slidably coupled to the support shaft.

20 Claims, 4 Drawing Sheets

METHOD AND APPARATUS FOR SAFELY HANDLING RADIOACTIVE SOURCES

CROSS-REFERENCED TO RELATED APPLICATIONS

This invention claims the benefit of U.S. Provisional Application Ser. No. 60/559,562, filed on Apr. 5, 2004, incorporated herein in its entirety.

BACKGROUND OF THE INVENTION

The invention relates to an apparatus and a method for transporting a radioactive source into and out of an enclosure.

Radioactive materials are used in many fields, such as energy development, hydrocarbon exploration, and medical and scientific research. In hydrocarbon exploration, the radioactive source is located inside a carrier disposed within a downhole tool, such as a wireline logging, measurements-while-drilling (MWD), or logging-while-drilling (LWD) tool, and the downhole tool is passed through a borehole penetrating a geological formation of interest. One conventional technique involves irradiating the formation with high-energy neutrons and monitoring the resulting energy spectra, which are generally indicative of the characteristics of the formation. The radioactive source carrier is secured in a radiation carrying shield when it is not inside the downhole tool. A dedicated handling tool is used to transfer the radioactive source carrier between the radiation carrying shield and the downhole tool. It is desirable that such handling tools allow for efficient and safe handling of the radioactive source carrier in order to minimize exposure time to the radioactive source, prevent any unintended release from the radioactive source, and maximize the distance between the radioactive source and the tool operator.

Handling tools for transporting radioactive source carriers into and out of enclosures such as downhole tools and radiation carrying shields are known in the art. One prior art handling tool has several finger-shaped members at a terminal end that are adapted to close around a dovetail on a cap of the radioactive source carrier. The finger-shaped members are closed around the dovetail by rotating the tool. Often, the finger-shaped members do not securely grasp the dovetail, for example, because they are worn, rusty, broken, bent, too short, dirty or frozen, making it easy for the radioactive source carrier to become loose during transport. A secondary locking feature includes a wire spring clip on a loose chain secured to the side of the tool. The operator squeezes the spring clip while inserting the wire part of the clip into a mating hole in the cap of the radioactive source carrier. Securing the wire part of the clip to the cap requires the operator, while holding onto the handling tool, to reach very close to the carrier. Other handling tools are described in, for example, U.S. Pat. No. 5,126,564 (Perry et al.) and U.S. Pat. No. 4,845,359 (Wraight).

SUMMARY OF THE INVENTION

In one aspect, the invention relates to a handling tool for a carrier containing a radioactive source which comprises a support shaft, a first locking tip slidably coupled to the support shaft and adapted to form a first lock with the carrier, and a second locking tip slidably coupled to the support shaft and adapted to form a second lock with the carrier.

In another aspect, the invention relates to a system for handling a radioactive source which comprises a container containing a radioactive source and a cap mounted on the container to retain the radioactive source inside the container, wherein the cap has a first locking structure and a second locking structure. The system further comprises a handling tool having a support shaft, a first locking tip adapted to form a first lock with the first locking structure, and a second locking tip adapted to form a second lock with the second locking structure, wherein the first and second locking tips are slidably coupled to the support shaft.

In another aspect, the invention relates to a method of handling a carrier containing a radioactive source which comprises engaging a first locking structure on the carrier with a first locking tip slidably coupled to a support shaft and engaging a second locking structure on the carrier with a second locking tip slidably coupled to the support shaft.

Other features and advantages of the invention will be apparent from the following description and the appended claims.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

Figure 1A:
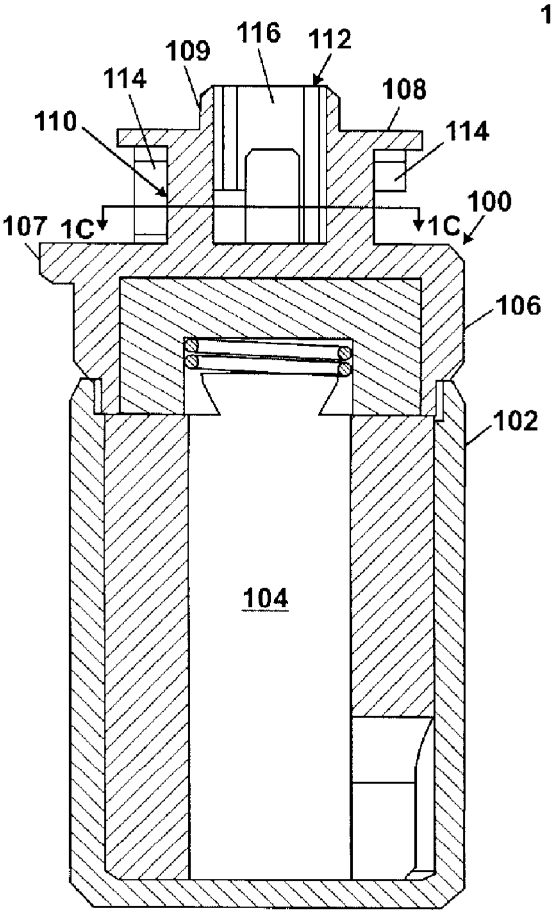
FIG. 1A is a vertical cross-section of a radioactive source carrier according to one embodiment of the invention.

FIG. 1A shows a radioactive source carrier 100 according to an embodiment of the invention. The radioactive source carrier 100 includes a container 102 containing a radiation source 104, such as a gamma or neutron source. A cap 106 secured to an open end of the container 102 retains the radiation source 104 inside the container 102. For downhole operations, the container 102 and cap 106 are sized to fit within an appropriate downhole tool. Also, the container 102 and cap 106 are capable of withstanding the temperatures and pressures in a borehole environment. The radioactive source carrier 100 may be provided with a structure that would assist in its placement inside an enclosure, such as a radiation carrying shield or downhole tool. For example, the cap 106 may include a tongue 107 designed to mate with a groove in the enclosure, or the cap 106 may include a groove that would mate with a tongue in the enclosure. The tongue and groove may be designed such that when they engage the radioactive source carrier 100 is in a desired orientation within the enclosure.

Figure 1C:
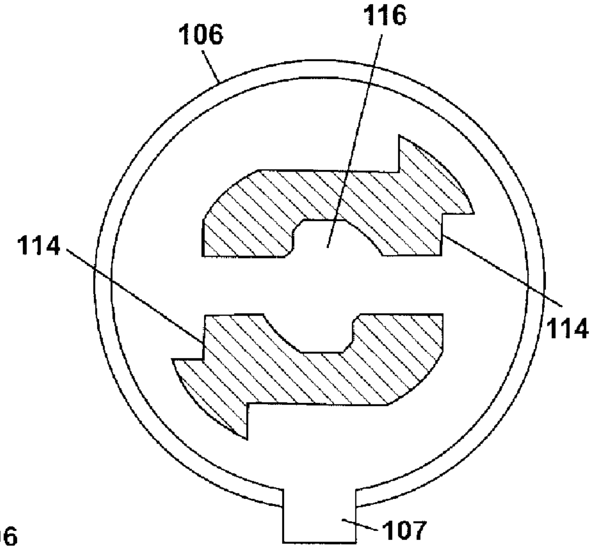
FIG. 1C is a transverse cross-section of the radioactive source carrier of FIG. 1A.
Figure 1B:
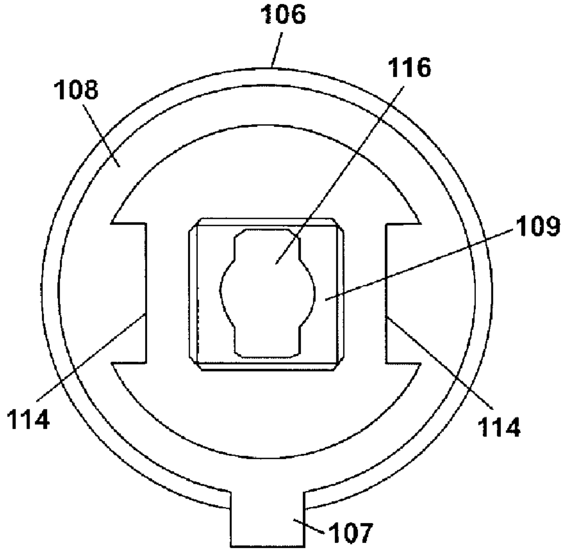
FIG. 1B is an end view of the radioactive source carrier of FIG. 1A.

The cap 106 includes stacked ridges 108, 109. In one embodiment, a first locking structure 110 including a pair of diametrically-opposed slots 114 is formed in the side of the ridge 108. The first locking structure 110 receives and interlocks with a first locking tip of a handling tool of the invention. In one embodiment, a second locking structure 112 including a keyhole 116 is formed in the centers of the ridges 108, 109. The second locking structure 112 receives and interlocks with a second locking tip of a handling tool of the invention. The first and second locking structures 110, 112 are further illustrated in FIG. 1B, which shows an end view of the cap 106, and FIG. 1C, which shows a cross-section of the cap 106. The details of the locking structures 110, 112 can vary from that shown in FIGS. 1A-1C. However any variations made to the locking structures 110, 112 should be complementary with the first and second locking features of the handling tool of the invention and vice versa.

FIGS. 2A-2D together form a complete assembly of a handling tool 200 according to one embodiment of the invention. A single operator can use the handling tool 200 to transport the radioactive source carrier 100 (FIG. 1A) into and out of an enclosure, such as a radiation carrying shield or downhole tool. The handling tool 200 includes a support shaft 202. In one embodiment, a removable socket 206 is attached to a lower end of the support shaft 202, as illustrated at 207. The connection at 207 may be provided by pins, threads, and the like. The removable socket 206 and the support shaft 202 may be used as a socket wrench wherever there is a need for such a tool. The integrated wrench allows for a one-person operation as opposed to the two-person operations currently performed. In one embodiment, the removable socket 206 fits over a protuberance such as a bolt or nut or ridge. Such protuberance may be on an access door to an enclosure, such as a radiation carrying shield or downhole tool, or may be on the cap 106 (FIG. 1A) of the radioactive source carrier 100 (FIG. 1A).

Figure 2A:
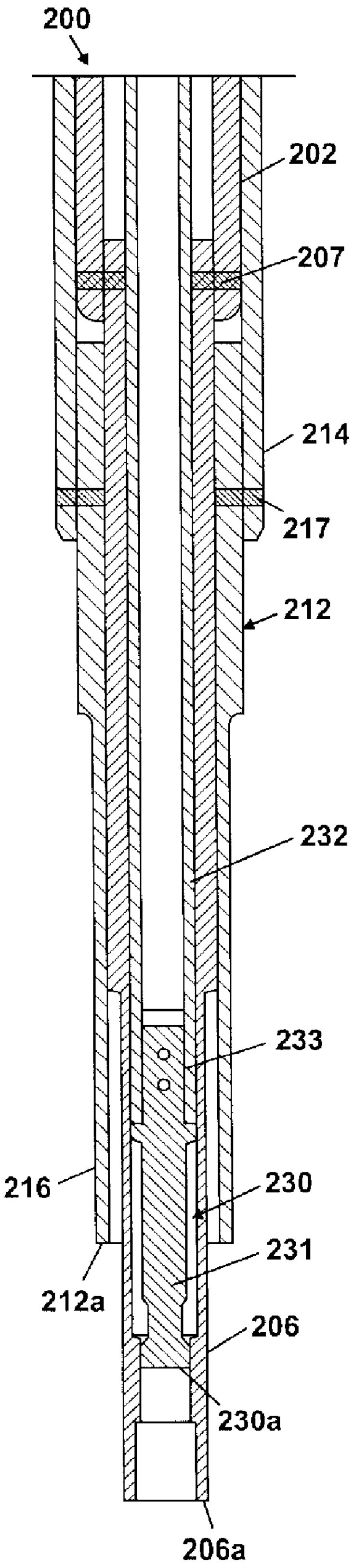
FIG. 2A is an enlarged cross-section of a lower portion of a handling tool according to one embodiment of the invention.
Figure 2B:
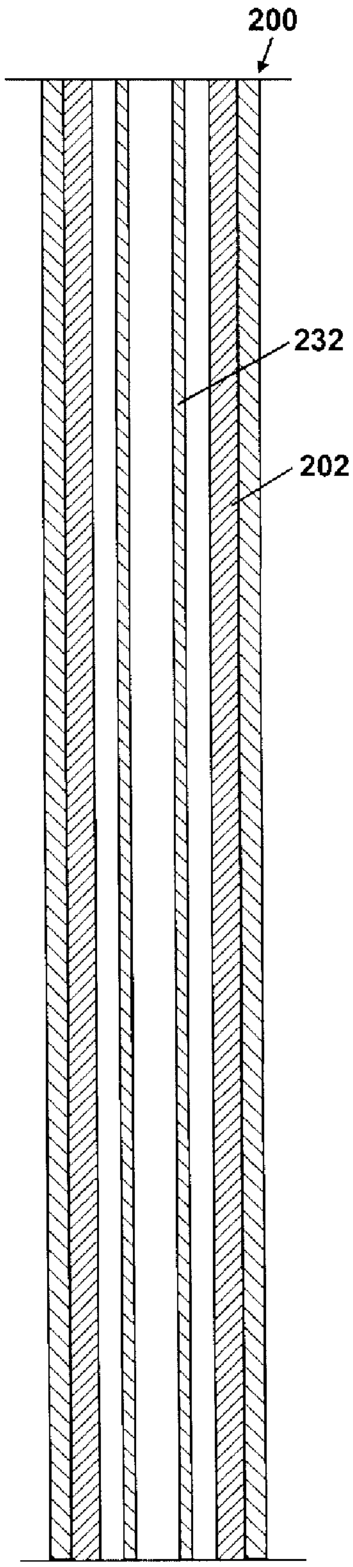
FIG. 2B is an enlarged cross-section of an intermediate portion of the handling tool of FIG. 2A and is a continuation of FIG. 2A.
Figure 2C:
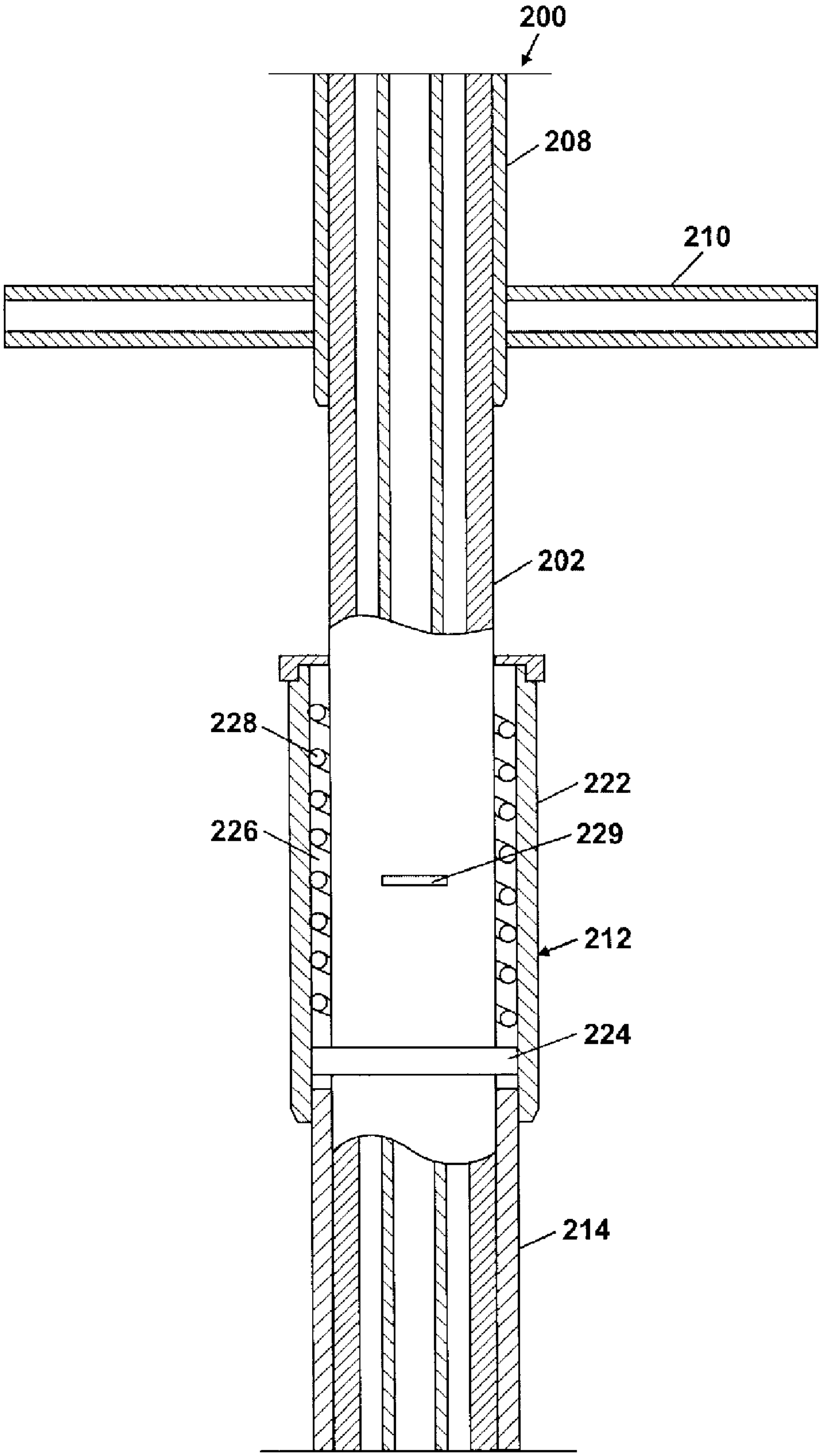
FIG. 2C is an enlarged cross-section of an intermediate portion of the handling tool of FIG. 2A and is a continuation of FIG. 2B.

In FIG. 2C, a sleeve 208 carrying a handle 210 is secured to the support shaft 202, near the end closest to the tool operator. The tool operator uses the handle 210 to apply torque to the support shaft 202, and the support shaft 202 in turn transfers the torque to the removable socket 206 (FIG. 2A). The length of the support shaft 202 or combined length of the support shaft 202 and removable socket 206 (FIG. 2A) may be selected such that a desired safe distance is maintained between the tool operator and the radioactive source carrier 100 (FIG. 1A). Current governmental radiological standards provide guidelines for safe distances (e.g., 50 in. [127 cm] is a typical safe distance if one considers 2 ms/hr as an acceptable safety threshold).

Figure 2D:
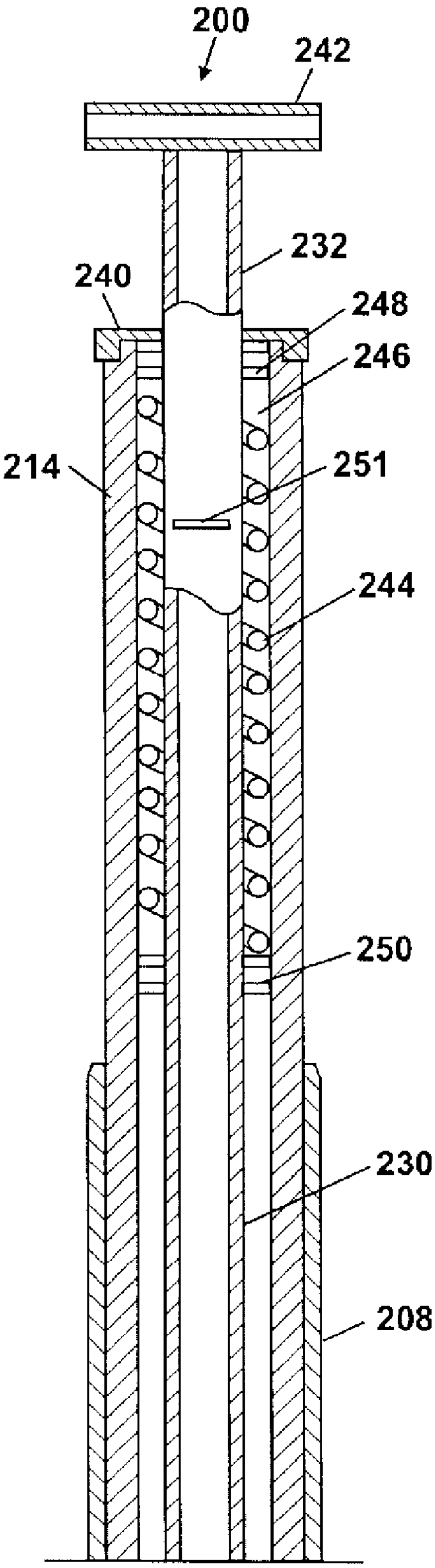
FIG. 2D is an enlarged cross-section of an upper portion of the handling tool of FIG. 2A and is a continuation of FIG. 2C.
Figure 2E:
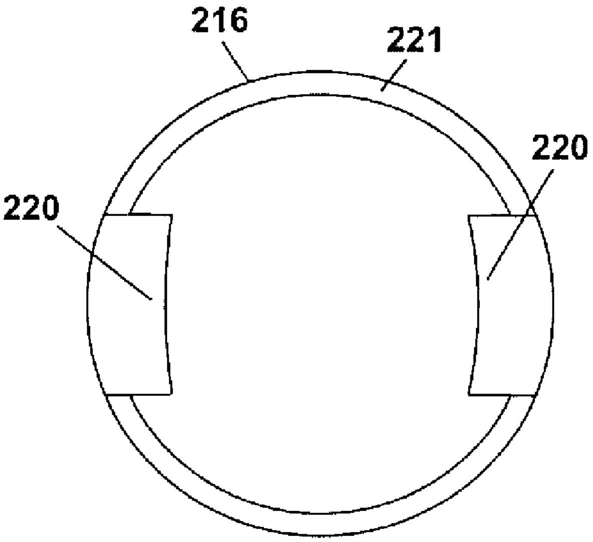
FIG. 2E shows an end view of the bayonet locking tip of FIG. 2A according to one embodiment of the invention.

Returning to FIG. 2A, the handling tool 200 includes a first lock assembly 212 for providing a first lock between the handling tool 200 and the radioactive source carrier 100 (FIG. 1A). The first lock assembly 212 includes a first locking shaft 214 mounted on and coaxially with the support shaft 202. The first lock assembly 212 further includes a bayonet locking tip 216 having one end attached to a lower end of the first locking shaft 214, as indicated at 217. Preferably, the connection at 217 is releasable. The releasable connection at 217 may be provided by pins, threads, or any other suitable means known in the art. In one embodiment, as shown in FIG. 2E, the locking end of the bayonet locking tip 216 includes a pair of diametrically-opposed bosses 220 formed on a tubular wall 221. The bosses 220 are adapted to engage the slots 114 (FIG. 1A) of the first locking structure 110 (FIG. 1A) of the radioactive source carrier 100 (FIG. 1A). In FIG. 2C, the first lock assembly 212 further includes a housing 222 coupled to an upper end of the first locking shaft 214. The housing 222 is disposed about the support shaft 202 and can slide along the support shaft 202. A ring 224 is attached to the support shaft 202. The ring 224, the housing 222, and the support shaft 202 define a cavity 226 inside which a spring 228 is disposed.

The first lock assembly 212 has an unlocked position and a locked position. In the unlocked position, the spring 228 is not compressed, and the tip 212*a* (FIG. 2A) of the first lock assembly 212 is above the tip 206*a* (FIG. 2A) of the removable socket 206 (FIG. 2A). In the locked position, the spring 228 is compressed, and the tip 212*a* (FIG. 2A) of the first lock assembly 212 is below the tip 206*a* (FIG. 2A) of the removable socket 206 (FIG. 2A). A marker 229 may be formed on the support shaft 202 such that it is exposed only when the first lock assembly 212 is in the locked position. The marker 229 may be suitably colored so that it is visible from the operator end of the handling tool 200 and can be used to ascertain whether or not the lock is formed between the first lock assembly 212 and the radioactive source carrier 100 (FIG. 1A). For alignment purposes, a marker (not shown) may also be provided on the housing 222. Matching of the marker on the housing 222 with the marker 229 may indicate that the first lock has been formed. For example, matching of the marker on the housing 222 with the marker 229 may require turning of the housing 222 by 90 degrees in a specific direction that will result in forming of the first lock.

Figure 2F:
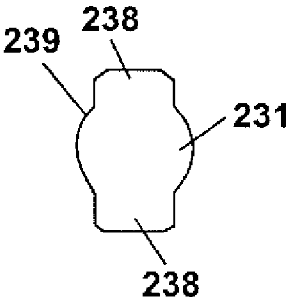
FIG. 2F shows an end view of the key locking tip of FIG. 2A according to one embodiment of the invention.

Returning to FIG. 2A, the handling tool 200 further includes a second lock assembly 230 for providing a second lock between the handling tool 200 and the radioactive source carrier 100 (FIG. 1A). The second lock assembly 230 is concentric with and independent from the first lock assembly 212. The second lock assembly 230 includes a second locking shaft 232 mounted inside and coaxially with the support shaft 202. The second lock assembly 230 further includes a key locking tip 231 having one end attached to a lower end of the second locking shaft 232, as indicated at 233. Preferably, the connection at 233 is releasable. The connection at 233 may be provided by pins, threads, or any other suitable means known in the art. In one embodiment, as shown in FIG. 2F, the locking end of the key locking tip 231 includes a key having pair of opposing bosses 238 formed on a pin 239. The bosses 238 are adapted to engage the keyhole 116 (FIG. 1A) of the second locking structure 112 (FIG. 1A) of the radioactive source carrier 100 (FIG. 1A). In FIG. 2D, the upper end of the second locking shaft 232 extends through a guide plate 240 coupled to the upper end of the first locking shaft 214 and terminates at a handle 242. A spring 244 is disposed in a cavity 246 formed by the support shaft 202, a ring 248 attached to the support shaft 202, the second locking shaft 232, and a ring 250 attached to the second locking shaft 232.

Returning to FIG. 2A, the second lock assembly 230 has an unlocked position and a locked position. In the unlocked position, the spring 244 (FIG. 2D) is not compressed, and the tip 230*a* of the second lock assembly 230 is retracted inside the removable socket 206. In the locked position, the spring 244 is compressed, and the tip 230*a* of the second lock assembly 230 extends below the tip 206*a* of the removable socket 206. Referring to FIG. 2D, a marker 251 may be formed on the second locking shaft 232 such that it is exposed only when the second lock assembly 230 is in the locked position. The marker 251 may be suitably colored so that it is visible from the operator end of the handling tool 200 and can be used to ascertain whether or not the lock is formed between the second lock assembly 230 and the radioactive source carrier (100 in FIG. 1A). For alignment purposes, a marker (not shown) may also be provided on the guide plate 240. Matching of the marker on the guide plate 240 with the marker 251 may indicate that the second lock has been formed. For example, matching of the marker on the guide plate 240 with the marker 251 may require turning of the second locking shaft 232 by 90 degrees in a specific direction that will result in forming of the second lock.

Two independent locks can be formed between the handling tool 200 (FIG. 2A) and the radioactive source carrier 100 (FIG. 1A). To form the first lock, the removable socket 206 (FIG. 2A) at the tip of the handling tool 200 is fitted over the ridge 109 (FIG. 1A) on the cap 106 (FIG. 1A) of the radioactive source carrier 100, thereby locking down the radioactive source carrier 100 while the independent locks are made up. Next, the housing 222 (FIG. 2C) is urged towards the cap 106 of the radioactive source carrier 100. This translational motion is transferred to the first locking shaft 214 (FIG. 2A) until the bosses 220 (FIG. 2E) of the bayonet locking tip 216 (FIG. 2A, FIG. 2E) are inserted into the slots 114 (FIG. 1A) of the first locking structure 110 (FIG. 1A) on the cap 106 of the radioactive source carrier 100. The housing 222 (FIG. 2C) is then turned 90 degrees. This rotational motion is transferred to the first locking shaft 214 such that the bayonet locking tip 216 is also turned 90 degrees and the bosses 220 of the bayonet locking tip 216 engage the walls of the slots 114, thereby forming the first lock. When the housing 222 is urged towards the cap 106, the spring 228 (FIG. 2C) is compressed. The compressed spring 228 maintains a positive lock between the bosses 220 and the walls of the slots 114, i.e., biases the bosses 220 against the walls of the slots 114. The first lock can only be removed by depressing the spring 228 and turning the first locking shaft 214 (or housing 222) by 90 degrees so that the first locking shaft 214 returns to its original position.

With the first lock formed and the removable socket 206 still in place on the ridge 109 of the cap 106 of the radioactive source carrier 100, the second lock can now be formed. To form the second lock, the handle 242 (FIG. 2D) is depressed, urging the second locking shaft 232 (FIG. 2A) and the bosses 238 and pin 239 (FIG. 2F) of the key locking tip 231 (FIG. 2A) into the keyhole 116 (FIG. 1A) of the second locking structure 112 (FIG. 1A) on the cap 106 of the radioactive source carrier 100. The handle 242 is then turned 90 degrees. This rotational motion is transferred to the second locking shaft 232 such that the key locking tip 231 is also turned 90 degrees and the bosses 238 (FIG. 2F) of the key locking tip 231 engage the wall of the keyhole 116, thereby forming the second lock. The spring 244 is compressed when the handle 242 is depressed to form the second lock. The compressed spring 244 maintains a positive lock between the bosses 238 and the wall of the keyhole 116, i.e., biases the bosses 238 against the wall of the keyhole 116. The second lock can only be removed by depressing the spring 244 and turning the handle 242 so that the handle 242 returns to its normal position.

The invention provides several advantages over conventional systems. The handling tool provides two independent locks with the radioactive source carrier. Both locks are spring loaded to positively lock the radioactive source carrier to the handling tool. The only way the radioactive source carrier can come loose from the handling tool is by depressing both springs and then turning the locking shafts 90 degrees to release. The source has to be retained to prevent spinning. If the source carrier spins, the two locking mechanisms cannot be unlocked. It has been demonstrated that the radioactive source carrier cannot be accidentally knocked off the handling tool without depressing both locking springs. The locking mechanisms can be manipulated quickly and easily by a single operator from a safe distance. This increases the efficiency of the operation and reduces the time during which the operator is exposed to radiation from the radioactive source carrier. The cap of the radioactive source carrier includes slot and keyhole features that match the bayonet and key locking features on the handling tool. Once the socket at the tip of the handling tool is locked onto the cap of the radioactive source carrier, the locking mechanisms can be engaged without the operator visually seeing the carrier. The operator end of the handling tool offers a positive indication of the carrier being locked or unlocked.

While the invention has been described with respect to a limited number of embodiments, those skilled in the art, having benefit of this disclosure, will appreciate that other embodiments can be devised which do not depart from the scope of the invention as disclosed herein. Those skilled in the art will appreciate that the disclosed apparatus and its constituent articles can be formed of any suitable materials, including non-metallic components formed using composites or synthetic materials. It will also be appreciated that the invention is not to be limited to any particular industry or field of use.

What is claimed is:

1. A handling tool for a carrier containing a radioactive source, comprising:
- a support shaft;
- a first locking tip slidably coupled to the support shaft and adapted to form a first lock with the carrier; and
- a second locking tip slidably coupled to the support shaft and adapted to form a second lock with the carrier.

2. The handling tool of claim 1, wherein the first locking tip and the second locking tip are spring loaded.

3. The handling tool of claim 1, wherein the first locking tip is concentric with the second locking tip.

4. The handling tool of claim 1, further comprising a first locking shaft releasably coupled to the first locking tip, wherein the first locking shaft is mounted coaxially with the support shaft and is rotable and slidable relative to the support shaft.

5. The handling tool of claim 1, further comprising a second locking shaft releasably coupled to the second locking tip, wherein the second locking shaft is mounted coaxially with the support shaft and is rotable and slidable relative to the support shaft.

6. The handling tool of claim 5, further comprising a handle formed at an end of the second locking shaft for urging the second locking shaft along the support shaft.

7. The handling tool of claim 1, further comprising one or more markers for indicating when the handling tool is in a locked position.

8. The handling tool of claim 1, further comprising a handle disposed on the support shaft for applying a torque to the support shaft.

9. The handling tool of claim 1, further comprising a removable socket coupled to the support shaft to form a socket wrench.

10. The handling tool of claim 9, wherein the removable socket, the first locking tip, and second locking tip are concentric.

11. A system for handling a radioactive source, comprising:

a container containing a radioactive source;

a cap mounted on the container to retain the radioactive source inside the container, the cap having a first locking structure and a second locking structure; and a handling tool having a support shaft, a first locking tip adapted to form a first lock with the first locking structure, and a second locking tip adapted to form a second lock with the second locking structure, wherein the first and second locking tips are slidably coupled to the support shaft.

12. The handling tool of claim 11, wherein the first locking tip comprises a plurality of bosses adapted to interlock with a plurality of slots in the first locking structure.

13. The handling tool of claim 11, wherein the second locking tip comprises a key adapted to interlock with a keyhole in the second locking structure.

14. The handling tool of claim 11, wherein the handling tool further comprises a removable socket coupled to the support shaft.

15. The handling tool of claim 14, wherein the cap comprises a protuberance adapted to mate with the removable socket.

16. The handling tool of claim 11, further comprising springs for biasing the first locking tip against the first locking structure and the second locking tip against the second locking structure.

17. The handling tool of claim 11, wherein the cap includes a tongue or groove adapted to mate with a corresponding tongue or groove in an enclosure of interest.

18. A method of handling a carrier containing a radioactive source comprising:

engaging a first locking structure on the carrier with a first locking tip slidably coupled to a support shaft; and engaging a second locking structure on the carrier with a second locking tip slidably coupled to the support shaft.

19. The method of claim 18, further comprising locking down the carrier prior to engaging the first and second locking structures with the first and second locking tips.

20. The method of claim 18, wherein engaging the first and second locking structures with the first and second locking tips comprises biasing the first and second locking tips against the first and second locking structures, respectively.

* * * * *